J. SHIPMAN.
APPARATUS FOR MAKING PHOTOGRAPHIC ENLARGEMENTS.
APPLICATION FILED JUNE 12, 1918. RENEWED JUNE 13, 1921.
1,403,714.  Patented Jan. 17, 1922.
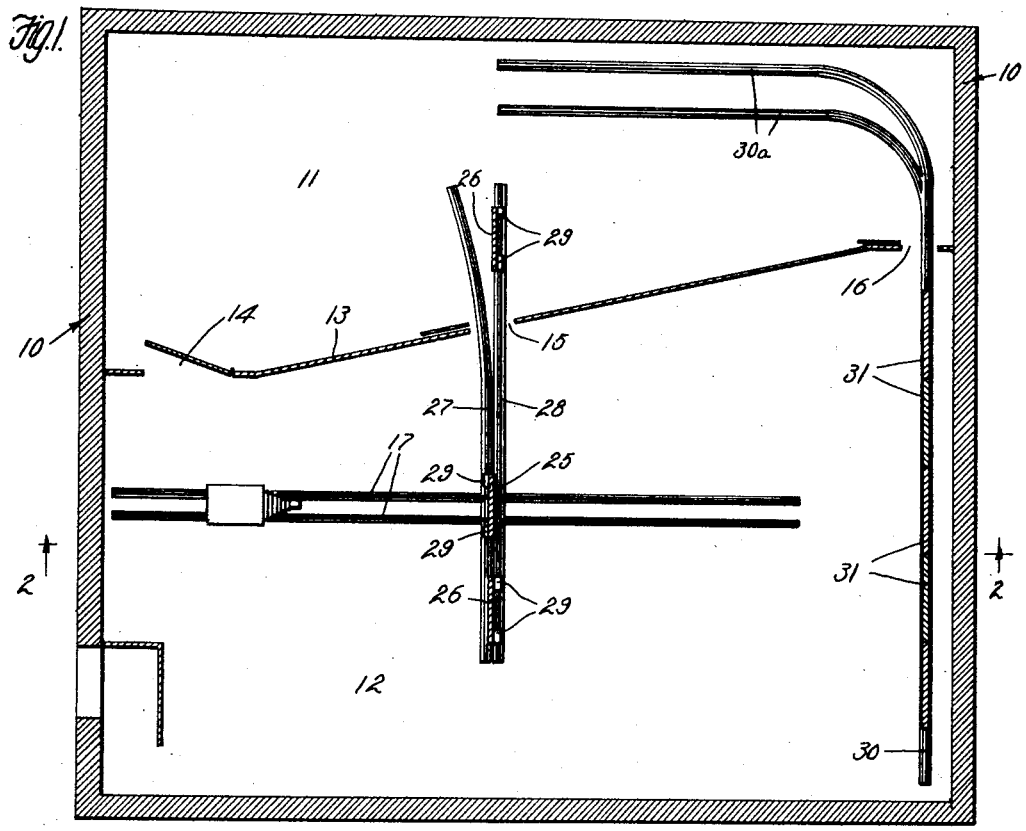
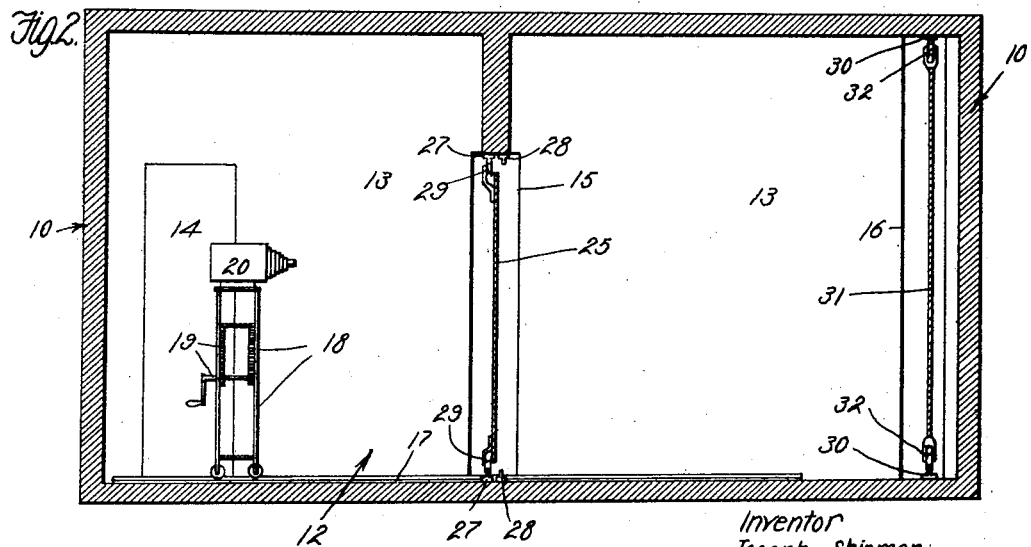
Inventor
Joseph Shipman
his Attorney

UNITED STATES PATENT OFFICE.

JOSEPH SHIPMAN, OF LOS ANGELES, CALIFORNIA.

APPARATUS FOR MAKING PHOTOGRAPHIC ENLARGEMENTS.

1,403,714.     Specification of Letters Patent.     Patented Jan. 17, 1922.

Application filed June 12, 1918, Serial No. 239,502. Renewed June 13, 1921. Serial No. 477,347.

*To all whom it may concern:*

Be it known that I, JOSEPH SHIPMAN, a subject of the Dominion of Canada, residing at Los Angeles, in the county of Los Angeles, State of California, have invented new and useful Improvements in Apparatus for Making Photographic Enlargements, of which the following is a specification.

This invention relates to apparatus which is particularly designed for the efficient making of photographic enlargements; and an object of the invention is to provide an arrangement whereby such enlargements may be expeditiously and efficiently made, and whereby the sensitive element (usually a sensitized paper or linen) may be quickly, efficiently and easily handled. In making photographic enlargements of very large size it has been found more or less difficult to efficiently and quickly handle the large expanse of sensitive surface whether composed of one or more pieces; and it is one of the objects of this invention to provide a means whereby the sensitive surface may be easily handled. It is also an object of this invention to provide an apparatus and an arrangement whereby photographic enlargements of all kinds and sizes may be made quickly, and the enlarging camera kept in in more nearly constant use than has heretofore been possible.

These objects of the invention, and others, will appear from the following detailed specification wherein I describe a preferred form and arrangement of my apparatus; reference being had to the accompanying drawings in which—

Fig. 1 is a plan section of my improved apparatus and Fig. 2 is a sectional elevation taken on line 2—2 of Fig. 1.

In the drawings the numeral 10 designates a suitable structure of any kind which encloses two compartments 11 and 12; compartment 11 being in the nature of a loading and unloading compartment or room and compartment 12, being in the nature of an exposing compartment or room. Between these two compartments there is a wall 13 which, for the purposes herein described, is preferably placed somewhat angularly and generally longitudinally of the room. A communication door may be arranged at 14 between the two compartments; and other openings at 15 and 16 between the two compartments provide means for passing the carriers for the sensitive element, as hereinafter described.

The exposing compartment 12 has therein a longitudinal track or rail-way 17 and a camera stand 18 is arranged to run on this track. This camera stand 18 is arranged to be adjustable in height; any suitable racking means as indicated at 19 may be used for racking the camera stand up and down to adjust the height of the enlarging camera 20 carried upon the upper end of the stand. By such a means as here described camera 20 is adjustable longitudinally of the compartment and is adjustable also for height. The enlarging camera may be of any desired character; and so far as my present invention is concerned, it may be of any of the ordinary kind. For the making of relatively small or medium sized enlargements, I provide an apparatus which comprises essentially a plurality of boards 25 and 26 operating upon a double-trackway 27, 28. There are rails 27 and 28 both on the floor and at the upper edge which may be of any desired height, and the boards 25 and 26 have rollers 29 which travel on these respective rails. In the present instance, although any number of boards desired may be used, I have shown three boards, one of the boards 25 travelling upon the rails 27 while the other two boards 26 travel upon the rails 28. The boards are so arranged, being so hung and supported upon their rollers 29, that they will all come into a common transverse plane when they are in position in the exposing compartment 12; but inside the compartment 11 the two tracks 27 and 28 diverge so that several boards may then pass each other; so that any one selected board may be passed out into the exposing compartment 12 when desired. In the use of three such boards, one of these boards may be a test board; that is, it may carry a test-piece of the sensitive element, to be run out before the camera, and an exposure test made prior to the actual enlarging exposure. Then after the test is made, one of the boards with its sensitive element (a sheet of sensitive paper, as a general rule, attached to its front surface) may be run out before the camera and the enlarging exposure made. While this enlarging exposure is being made the other board is being provided with its sensitive element inside the loading room; and when the exposure is finished, the exposed element is moved back into compartment 11 and the loaded board is moved out into position for exposure. This alternate loading, unloading and exposure may be carried on as long as desired; and the enlarging camera 20 is kept busy during a large proportion of the time. The test board also serves the purpose of fixing the focus accurately; and the focus having been once fixed, and the several boards all standing in the same plane when they are in compartment 12, the focus need not be thereafter adjusted for any number of enlarging reproductions.

For the larger sizes of enlargements I have, near the back of the compartment 12, a transverse track-way which comprises preferably two rails 30 arranged above and below; and the boards 31 have rollers 32 which travel on these rails. These rails 30 pass through the opening 16 into the loading and unloading compartment 11, and there I employ a pair of divergent switch rails 30$^a$ onto which the boards may be passed, so that the boards may pass each other and so that all the boards may be switched into the loading and unloading compartment in compact and convenient arrangement. Within the compartment 11 the boards 31 are provided with their sensitive element. This sensitive element usually comes in the form of a roll of paper of standard width, and the boards 31 are made to accommodate paper of that width; the paper being put upon the boards in such a manner that the edges of the paper strip match or slightly overlap each other when the boards 31 are put in position in compartment 12. When the boards 31 are all loaded and put into the compartment, then I have, in effect, a large expanse of sensitive surface made up of strips of sensitized paper joined edge to edge or slightly overlapping and all in a common plane. A preliminary test for time of exposure and focus may be made upon one of the boards on a small piece of paper before the actual enlarging exposure is made; and then when all of the boards are in position, the enlarging exposure, or any number of successive enlarging exposures, may be readily made. When an exposure has been made the boards with their sensitive elements are removed into the compartment 11 where the exposed papers are removed and then further treated in any suitable manner. By employing a suitable number of the boards 31 it is practicable to have a set of them inside the compartment 11 being loaded while the other set is in compartment 12 during the exposing operation; the two sets of boards being alternated between the two compartments in the general manner hereinbefore described.

Having described a preferred form of my invention, I claim:

1. In combination, a structure having transverse and longitudinal ways, an enlarging camera on the longitudinal ways, and a plurality of sensitive element carrying boards on the transverse ways, the ways having at one end a divergent switching arrangement so that the boards may pass one another.

2. In combination, a structure embodying two separate compartments in the nature of a loading and unloading compartment and an exposing compartment, a longitudinal way in the exposing compartment, an enlarging camera on the longitudinal way, a transverse way extending from inside the loading and unloading compartment into and transversely across the exposing compartment, and sensitive element carrying boards on said transverse way.

3. In combination, a structure embodying two separate compartments in the nature of a loading and unloading compartment and an exposing compartment, a longitudinal way in the exposing compartment, an enlarging camera adapted to run on said longitudinal way, a transverse way extending from inside the loading and unloading compartment into and transversely across the exposing compartment, and sensitive element carrying boards on said transverse way, said way having a diverging switch arrangement in the first mentioned compartment so that the boards may pass one another.

4. In combination, a structure embodying two separate compartments in the nature of a loading and unloading compartment and an exposing compartment, a longitudinal way in the exposing compartment, an enlarging camera movable on the longitudinal way, the camera being vertically adjustable for different heights, a transverse way extending from inside the loading and unloading compartment into and transversely across the exposing compartment, and sensitive element carrying boards on said transverse way.

5. In combination, a structure embodying two separate compartments in the nature of a loading and unloading compartment and an exposing compartment, a longitudinal way in the exposing compartment, an enlarging camera on the longitudinal way, a pair of transverse ways extending from within the first mentioned compartment transversely across the exposing compartment, one of the ways being nearer the camera than the other, and sensitive element carrying boards on said ways movable between the two compartments.

6. In combination, a structure embodying two compartments in the nature of a loading and unloading compartment and an exposing compartment, a longitudinal trackway in the exposing compartment, a camera frame thereon arranged to be adjustable as for height, an enlarging camera on the frame, transverse railways extending from within the loading and unloading compartment into and transversely across the exposing compartment, said ways having within the first mentioned compartment a divergent switching arrangement, and sensitive element carrying boards on said ways.

In witness that I claim the foregoing I have hereunto subscribed my name this 6th day of June, 1918.

JOSEPH SHIPMAN.